United States Patent [19]

Mésaros et al.

[11] 4,190,635

[45] Feb. 26, 1980

[54] PROCESSES FOR PREPARING SODIUM PERCARBONATE

[75] Inventors: Louis Mésaros, Oullins; Paul Mollard, Sainte Foy les Lyon, both of France

[73] Assignee: Produits Chimiques Ugine Kuhlmann, Paris, France

[21] Appl. No.: 868,680

[22] Filed: Jan. 11, 1978

[30] Foreign Application Priority Data

Feb. 11, 1977 [FR] France .................... 77 03856

[51] Int. Cl.$^2$ ............................................. C01B 15/10
[52] U.S. Cl. .................................................. 423/415 P
[58] Field of Search ............................. 423/415, 415 P

[56] References Cited

U.S. PATENT DOCUMENTS

| | | | |
|---|---|---|---|
| 4,018,874 | 4/1977 | Mollard | 423/415 P |
| 4,022,874 | 5/1977 | Mollard et al. | 423/415 P |
| 4,025,609 | 5/1977 | Matsunaga | 423/415 P |

*Primary Examiner*—Earl C. Thomas
*Attorney, Agent, or Firm*—Brooks, Haidt, Haffner & Delahunty

[57] ABSTRACT

Improved processes for preparing sodium percarbonate, $2Na_2CO_3.3H_2O_2$, which can have an apparent density of 0.6 to 1 g/cm$^3$ and a mean particle diameter of 210 to 610 microns, which processes comprise treating a sodium carbonate monohydrate or hydrate having 75 to 90% of $Na_2CO_3$ and having a density equal to or even greater than 1.2 g/cm$^3$ with 60 to 80% aqueous hydrogen peroxide, the reaction mixture containing a small quantity of nonionic surfactant stable in hydrogen peroxide and alkaline solutions, the percarbonate formed being well adapted for use in detergent compositions.

5 Claims, No Drawings

PROCESSES FOR PREPARING SODIUM PERCARBONATE

BACKGROUND OF THE INVENTION

The present invention relates to improvements in processes for the preparation of sodium percarbonate, and more specifically, it relates to processes for the preparation of sodium percarbonate having the formula $2Na_2CO_3.3H_2O_2$ by the action of aqueous hydrogen peroxide on hydrated sodium carbonate.

U.S. Pat. No. 4,022,874 describes processes for the preparation of sodium percarbonate by the action of aqueous hydrogen peroxide solutions containing from 60% to 80% hydrogen peroxide on particular sodium carbonates. These prior art processes are characterized by the fact that the sodium carbonate feed material is selected from sodium carbonate monohydrate and hydrated sodium carbonates containing from 75 to 90% sodium carbonate.

It is desirable, when the sodium percarbonate is to be used as a component of detergent compositions, that the finished material have, in addition to good resistance to shock and attrition, an apparent density of from about 0.6 to about 1 g/cm$^3$ and a mean diameter of from about 210 to 610 microns. According to the procedure for the preparation of such percarbonates, disclosed in the aforesaid Patent, the sodium carbonate feed should have an apparent density of from about 0.450 to 0.750 g/cm$^3$ and a mean diameter of from about 200 to about 450 microns. The fact that the feed sodium carbonate has an apparent density in the range of 0.450 to 0.750 g/cm$^3$ is somewhat of an inconvenience in the preparation of the sodium carbonate monohydrate.

An economical method for preparing the monohydrate is, in effect, to carbonate 48% commercial soda with purified combustion gas containing 12% carbon dioxide by volume. This carbonation method is on the one hand advantageous in obtaining a good recovery of carbon dioxide during the course of the carbonation operation because it reduces the size of the purification apparatus for the combustion gas and that of the compressor utilized to introduce the gas into the soda carbonation apparatus. On the other hand, the carbonation method simultaneously causes precipitation of sodium carbonate monohydrate under the usual conditions of temperature and pressure and permits an advantage in the process heat requirements by eliminating surplus water.

One of the conditions for obtaining a high recovery yield of carbon dioxide is that the carbonate solutions contain an excess of free soda. However, under these conditions the monohydrated carbonate which precipitates is in the form of very compact crystals which reach or surpass a density of 1.2 g/cm$^3$ and which are only very slightly reactive with hydrogen peroxide.

THE INVENTION

It has surprisingly been found that the addition of small quantities of a nonionic surfactant permits the utilization of sodium carbonate monohydrate having an apparent density which reaches or exceeds 1.2 g/cm$^3$ for the preparation of sodium carbonate having the sought-after characteristics of good resistance to shock and attrition, an apparent density of 0.6 to 1 g/cm$^3$, and a mean diameter of 250 to 610 microns with good yield. Briefly, the process for the preparation of sodium percarbonate according to the present invention comprises the addition of small quantities of a nonionic surfactant to the hydrogen peroxide-sodium carbonate monohydrate reaction mixture. The reaction system is aqueous.

All parts, percentages, proportions, and ratios herein are by weight unless otherwise indicated.

The nonionic surfactant can be added to the aqueous hydrogen peroxide solution or it can equally also be used to impregnate the feed carbonate. One of the advantages of the present invention is that any nonionic surfactant can be used so long as it is stable on the one hand to concentrated solutions of hydrogen peroxide and on the other hand to alkaline solutions of sodium carbonate. The times, temperatures, and pressures used are as in the aforesaid Patent.

Certain desirable nonionic surfactants utilized herein are polyols which are condensation products of hydrophobic bases such as condensates of lower alkylene oxides and/or glycols, like those of ethylene and propylene, with lower alkylene oxides such as ethylene oxide; or condensates of lower alkylene oxides such as ethylene oxide with aliphatic alcohols having eight to twelve carbon atoms; or alkylene diamines, such as ethylene diamine, N-substituted with alkylene oxides, such as by first condensing the diamine with propylene oxide and then with ethylene oxide.

The term "a small quantity" of surfactant as used herein means a small amount which is effective in the process. Such quantities are preferably on the order of from about 200 to about 500 parts per million (ppm) based on the quantity of percarbonate prepared. When the nonionic surfactant is introduced into the hydrogen peroxide solution, the solution preferably contains from about 0.5 to about 1 g/L of the surfactant.

The addition of the nonionic surfactant according to the present invention enables yields of sodium percarbonate greater than 90% to be obtained by reaction of the hydrogen peroxide on sodium carbonate monohydrate having an apparent density on the order of 1.2 g/cm$^3$. This is in sharp contrast to the yield obtained with the same sodium carbonate monohydrate: the yield is nil without the addition of a surfactant according to the present invention.

The following Examples are given to illustrate embodiments of the invention as it is presently preferred to practice it. It will be understood that these Examples are illustrative, and the invention is not to be considered as restricted thereto except as indicated in the appended Claims.

EXAMPLE I

Control Test (Without Surface Active Agent)

A planetary-movement laboratory mixer equipped with a paddle turning at 150 rpm and fitted with a jacekt supplied with water controlled at 30° C. is charged with 500 g of sodium carbonate monhydrate having an apparent density of 0.985 g/cm$^3$. During a one-half hour period, 68% hydrogen peroxide is poured into the mixer in an amount calculated to produce a product having the formula $2Na_2CO_3.3H_2O_2$.

A sodium percarbonate is obtained containing 12.29% active oxygen and having an apparent density of 0.768 g/cm$^3$ and a mean diameter of 600 microns. The yield based on hydrogen peroxide is 80.3%.

EXAMPLES II AND III

Addition of Nonionic Surface Active Agent in $H_2O_2$

The procedure of Example I is repeated, but 1 g/L of nonionic surface active agent is added to the starting hydrogen peroxide solution. The surface active agent used in these two Examples has the formula:

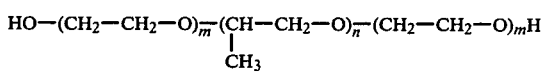

For the surface active agent of Example II, commercially sold under the name "Pluronic L 61" by Produits Chimiques Ugine Kuhlmann, Paris, France, the mean molecular weight of the hydrophobic base condensate (propylene oxide) is 1750, the overall mean molecular weight is 2000, and the mean ethylene oxide content is 10%. For the surface active agent of Example III, commercially available under the name "Pluronic L 62" from Produits Chimiques Ugine Kuhlmann, the average molecular weight of the hydrophobic base condensate (propylene oxide) is 1750, the overall average molecular weight is 2500, and the mean percentage of ethylene oxide is 20%.

The results obtained from these two Examples are shown in Table I.

TABLE I

| Example | Surface Active Agent | Amount of active oxygen in percarbonate % | Yield $H_2O_2$ % | Characteristics of product obtained | |
|---|---|---|---|---|---|
| | | | | Apparent Density g/cm$^3$ | Mean Diameter μ |
| 2 | Pluronic L 61 | 14.21 | 96.1 | 0.756 | 215 |
| 3 | Pluronic L 62 | 14.37 | 93.9 | 0.760 | 235 |

EXAMPLE IV

Control Test

The mixer used and the quantities of carbonate and aqueous hydrogen peroxide are the same as in Example I. The temperature is maintained at 30° C. The sodium carbonate monohydrate used has an apparent density of 1.15 g/cm$^3$. The aqueous hydrogen peroxide added has a strength of 68%.

The reaction mass totally decomposes when two-thirds of the stoichiometric quantity of hydrogen peroxide has been added.

EXAMPLES V-VIII

Addition of Nonionic Surfactant to the Sodium Carbonate

In these Examples, the procedure of Example IV is repeated with the starting carbonate being impregnated with a nonionic surfactant. This impregnation of carbonate is carried out by adding a 5% aqueous solution of the selected surfactant. The addition of the stoichiometric quantity of 68% aqueous hydrogen peroxide is carried out during 50 minutes.

The surfactant utilized in Example V is a product having the formula $$R-O(CH_2-CH_2O)_nH$$

obtained by polycondensation of ethylene oxide on a straight chain alcohol having 50% (±2%) of C$_9$ and 50% (±2%) of C$_{11}$. It has an ethylene oxide content per molecule of about 72%. It is commercially available from Produits Chimiques Ugine Kuhlmann under the name "Ukanil 85".

The surface active agent utilized in Example VI has the formula

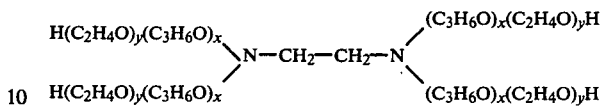

with the molecular weight of its hydrophobic base being from about 3500 to 4000, and it contains 10% ethylene oxide. It is commercially available from Produits Chimiques Ugine Kuhlmann under the name "Tetronic 901".

The surfactant used in Example VII is the "Pluronic L62" as used above in Example III.

The surfactant used in Example VIII is obtained by the polycondensation of ethylene oxide and propylene oxide with straight chain alcohol containing C$_9$ and C$_{11}$ chains. This material responds to the formula:

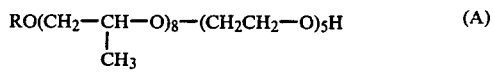

where R is the aforesaid alcohol radical.

The results of these runs are set forth in Table II.

TABLE II

| Example | Surfactant | Amount of active oxygen in percarbonate % | Yield $H_2O_2$ % | Characteristics of percarbonate | |
|---|---|---|---|---|---|
| | | | | Apparent Density g/cm$^3$ | Mean Diameter μ |
| V | Ukanil 85 | 13.56 | 96.5 | 0.674 | 560 |
| VI | Tetronic 901 | 13.49 | 97.5 | 0.707 | 335 |
| VII | Pluronic L 62 | 14.00 | 95.5 | 0.697 | 420 |
| VIII | Compound (A) | 12.47 | 96.2 | 0.773 | 310 |

What is claimed is:

1. A process for the production of sodium percarbonate, $2Na_2CO_3.3H_2O_2$, which process comprises providing a reaction mixture of solid sodium carbonate monohydrate a hydrated sodium carbonate containing from 75 to 90 percent $Na_2CO_3$ and 60 to 80 percent aqueous hydrogen peroxide, the reaction mixture containing a small but effective quantity of a nonionic surfactant, the surfactant being stable in concentrated solutions of hydrogen peroxide and alkaline sodium carbonate solutions, and forming sodium percarbonate, the apparent density of the solid sodium carbonate monohydrate or hydrated sodium carbonate being 0.985 g/cm$^3$ or greater.

2. A process according to claim 1 wherein the nonionic surfactant is mixed with the feed sodium carbonate prior to preparing the reaction mixture.

3. A process according to claim 1 wherein the nonionic surfactant is added to the feed aqueous hydrogen peroxide solution prior to preparing the reaction mixture.

4. A process according to claim 3 wherein 0.5 to 1 g/L of nonionic surfactant is added to the aqueous hydrogen peroxide.

5. A process according to claim 1 wherein the quantities of carbonate and peroxide are approximately stoichiometric.

* * * * *

UNITED STATES PATENT AND TRADEMARK OFFICE
CERTIFICATE OF CORRECTION

PATENT NO. : 4,190,635
DATED : February 26, 1980
INVENTOR(S) : LOUIS MESAROS and PAUL MOLLARD It is certified that error appears in the above-identified patent and that said Letters Patent are hereby corrected as shown below:

On title page, under "[30] Foreign Application Priority Data" change "77 03856" to --77 03865--.

Column 2, line 57, correct spelling of "jacket"; line 59, correct spelling of "monohydrate".

Column 4, line 46, after "hydrate" change "a" to --or--.

Signed and Sealed this

Fifteenth Day of July 1980

[SEAL]

Attest:

SIDNEY A. DIAMOND

Attesting Officer

Commissioner of Patents and Trademarks